(12) United States Patent
Maurice (10) Patent No.: US 9,636,631 B1
(45) Date of Patent: May 2, 2017

(54) MECHANICAL MEMBRANE FOR THE SEPARATION OF A PARAMAGNETIC CONSTITUENT FROM A FLUID

(71) Applicant: David Maurice, Corvallis, OR (US)

(72) Inventor: David Maurice, Corvallis, OR (US)

(73) Assignee: U.S. Department of Energy, Washington, DC (US)

( * ) Notice: Subject to any disclaimer, the term of this patent is extended or adjusted under 35 U.S.C. 154(b) by 192 days.

(21) Appl. No.: 14/684,475

(22) Filed: Apr. 13, 2015

(51) Int. Cl.
*B01D 53/02* (2006.01)
*B01D 53/22* (2006.01)
*B01D 63/00* (2006.01)
*B01D 69/02* (2006.01)

(52) U.S. Cl.
CPC ........... *B01D 53/228* (2013.01); *B01D 63/00* (2013.01); *B01D 69/02* (2013.01); *B01D 2325/46* (2013.01)

(58) Field of Classification Search
CPC ...... B01D 53/228; B01D 63/00; B01D 69/02; B01D 2325/46
See application file for complete search history.

(56) References Cited

U.S. PATENT DOCUMENTS

| | | | |
|---|---|---|---|
| 3,477,948 A * | 11/1969 | Kiyoshi | .......... B03C 1/032 210/223 |
| 4,704,139 A | 11/1987 | Yamamoto et al. | |
| 5,779,770 A | 7/1998 | Nitta et al. | |
| 8,672,138 B2 | 3/2014 | Raizen et al. | |
| 2002/0147424 A1* | 10/2002 | Ostrow | .......... A61M 37/00 604/20 |

(Continued)

OTHER PUBLICATIONS

Ciesla et al., "Theoretical consideration for oxygen enrichment from air using high-TC superconducting membrane," Przegl A̧ d Elektrotechniczny (Electrical Review), R. 88 NR 7b (2012).

(Continued)

*Primary Examiner* — Christopher P Jones
(74) *Attorney, Agent, or Firm* — Karen L. Blouin; Michael J. Dobbs; Brian J. Lally (57) ABSTRACT

The disclosure provides an apparatus and method for the separation of a paramagnetic component from a mixture using a mechanical membrane apparatus. The mechanical membrane comprises a supporting material having a plurality of pores where each pore is surrounded by a plurality of magnetic regions. The magnetic regions augment a magnetic field on one side of the supporting material while mitigating the field to near zero on the opposite side. In operation, a flow of fluid such as air comprising a paramagnetic component such as $O_2$ is directed toward the mechanical membrane, and the paramagnetic component is typically attracted toward a magnetic field surrounding a pore while diamagnetic components such as $N_2$ are generally repelled. As some portion of the fluid passes through the plurality of magnetic apertures to the opposite side of the mechanical membrane, the mechanical membrane generates a fluid enriched in the paramagnetic component. Alternately, the magnetic field may act to repel the paramagnetic component while diamagnetic components such as $N_2$ are generally unaffected and pass to the opposite side of the mechanical membrane.

13 Claims, 4 Drawing Sheets

(56) References Cited

U.S. PATENT DOCUMENTS

| | | | |
|---|---|---|---|
| 2003/0047505 A1* | 3/2003 | Grimes | B01D 63/16 210/483 |
| 2007/0069427 A1* | 3/2007 | Long | B01D 69/02 264/430 |
| 2007/0224700 A1* | 9/2007 | Masters | B01L 3/502761 436/501 |
| 2014/0231351 A1* | 8/2014 | Wickramasinghe | B01D 69/148 210/652 |

OTHER PUBLICATIONS

Zhu et al., "Powder Alignment System for Anisotropic Bonded NdFeB Halbach Cylinders," IEEE Transactions on Magnetics, vol. 36, No. 5, Sep. 2000.

Thompson, "Practical Issues in the Use of NdFeB Permanent Magnets in Maglev, Motors, Bearings, and Eddy Current Brakes," Proceedings of the IEEE, vol. 97, No. 11, Nov. 2009.

Rybak et al., "Magnetic mixed matrix membranes in air separation," Chemical Papers 68 (10) 1332-1340 (2014).

Wang et al., "A Novel Magnetic Separation Oxygen-enriched Method and the Influence of Temperature and Magnetic Field on Enrichment," Journal of Thermal Science vol. 16, No. 1 79-83 (2007).

Zhang et al., "Effect of magnetic yoke on magnetic field distribution and intercepting effect of multichannel cascading magnet arrays," AIP Conf. Proc. 1207, 974 (2010).

* cited by examiner

MECHANICAL MEMBRANE FOR THE SEPARATION OF A PARAMAGNETIC CONSTITUENT FROM A FLUID

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments of the present invention relates to a mechanical membrane for the separation of a paramagnetic component in a fluid, such as the separation of oxygen from air. The mechanical membrane comprises a plurality of pores having magnetic regions around each pore to augment a magnetic field on one side of the pore while mitigating the field to near zero on an opposite side.

BACKGROUND

Oxygen is a high value commodity chemical, with demand for tonnage quantities increasing due to a steady growth in process operations such as oxyfuel combustion and oxygen-blown gasification. Typically oxygen is generated via separation from air using cryogenic and non-cryogenic distillation. Cryogenic distillation methods are often utilized for applications that require high quantities of oxygen at low temperatures, while non-cryogenic separations typically involve the separation of air at ambient temperatures using either molecular sieve adsorbents via pressure swing adsorption (PSA), or membrane separation process using polymeric membranes. There are also air separation techniques using chemical processes based on absorption and desorption of oxygen at particular pressure and temperature conditions.

Oxygen has also been separated from air using by utilizing the difference in magnetic susceptibility between oxygen and nitrogen in processes generally referred to as magnetic separation. Oxygen is strongly parametric, and this has been exploited in a variety of configurations. In some methodologies, high gradient magnetic fields near the surfaces of magnetized wires have been utilized to capture oxygen molecules. In other methodologies, opposite magnetizing forces act on paramagnetic oxygen atoms and diamagnetic nitrogen atoms to separate trajectories. See e.g. U.S. patent application Ser. No. 13/691,723 by Raizen et al., filed Nov. 30, 2013 and published Jul. 11, 2013. The first method cannot enrich oxygen continuously because the magnetized wires have a saturation phenomenon to capture oxygen molecules, and the latter is strongly influenced by the gas turbulence and the molecular diffusion that results in the remixing of oxygen and nitrogen. Other approaches have utilized a "magnetic sieve" approach in order to continuously divert oxygen and nitrogen into separate streams. See Zhang et al., "Effect of magnetic yoke on magnetic field distribution and intercepting effect of multichannel cascading magnet arrays," *AIP Conf. Proc.* 1207 (2010); see also Wang et al., "A Novel Magnetic Separation Oxygen-enriched Method and the influence of Temperature and Magnetic Field on Enrichment," *Journal of Thermal Science* 16 (2007). Other approaches have utilized substantially porous materials through supporting materials which generate magnetic flux generally parallel to the pressure gradient of a flow in order to repel nitrogen while generally attracting oxygen into the pores. See e.g. Ciesla et al., "Theoretical consideration for oxygen enrichment from air using high-TC superconducting membrane," PRZEGLĄD ELEKTROTECHNICZNY (Electrical Review), R. 88 NR 7b (2012); and see U.S. Pat. No. 4,704,139 issued to Yamamoto et al, issued Nov. 3, 1987; and see U.S. Pat. No. 5,779,770 issued to Nitta et al., issued Jul. 14, 1998. These methodologies generally proscribe the presence of magnetic material over substantially all of the resulting devices, and typically generate a magnetic field expected to operate with a generally perpendicular orientation over the entirely of the device, regardless of pore location.

Provided here is a mechanical membrane for the separation of a paramagnetic component which utilizes a plurality of pores extending through a supporting material, with each pore surrounded by a plurality of magnetic regions arranged to optimize a magnetic field in the locality of an individual pore. The magnetic regions around a given pore are arranged to augment the magnetic field on one side of the supporting material while mitigating the field to near zero on the opposite side, in order to minimize the magnetic material required. In operation, a flow of fluid such as air comprising a paramagnetic component such as $O_2$ is directed toward the mechanical membrane, and the paramagnetic component is typically attracted toward a magnetic field surrounding a pore while diamagnetic components such as $N_2$ are generally repelled. Such an apparatus and method may be utilized for the magnetic separation of paramagnetic components from a mixture in a variety of environments and applications requiring tonnage quantities of oxygen.

These and other objects, aspects, and advantages of the present disclosure will become better understood with reference to the accompanying description and claims.

SUMMARY

The apparatus disclosed provides a mechanical membrane for the separation of a paramagnetic component from a fluid comprising the paramagnetic component, such as the separation of oxygen from air. The mechanical membrane comprises a supporting material with a first surface and a second surface generally opposite the first surface, with the supporting material surrounding a plurality of magnetic apertures. Each magnetic aperture comprises a pore extending through the supporting material and comprising a first pore opening and a second pore opening, and a plurality of magnetic regions around at least the first opening. The magnetic regions are arranged to provide a pore magnetic field comprising a first magnetic field portion above the first pore opening and a second magnetic field portion above the second pore opening, with the magnitude of the first magnetic field portion exceeding the magnitude of the second magnetic field portion. In a particular embodiment, the field strength of the first magnetic field portion is equal to at least 1.5 times the field strength of the second magnetic field portion. The magnetic regions may comprise a functionally graded material around each pore, or may comprise a series of permanent magnets.

The novel process and principles of operation are further discussed in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a mechanical membrane utilizing magnetic fields for he separation of a paramagnetic component in a fluid.

The disclosure provides an apparatus and method for the separation of a paramagnetic component from a mixture using a mechanical membrane apparatus. The mechanical membrane comprises a supporting material having a plurality of pores, where each pore extends through the supporting material, and where each pore is surrounded by a plurality of magnetic regions arranged to augment a magnetic field on one side of the supporting material while mitigating the field to near zero on the opposite side. The arrangement of the magnetic regions is analogous to a Halbach array, and the magnetic regions are positioned around each pore such that the magnetic moments around the pore are spatially rotated with respect to neighboring magnetic regions. In operation, a flow of fluid such as air comprising a paramagnetic component such as $O_2$ is directed toward the mechanical membrane, and the paramagnetic component is typically attracted toward a magnetic field surrounding a pore while diamagnetic components such as $N_2$ are generally repelled. As some portion of the fluid passes through the plurality of magnetic apertures to the opposite side of the mechanical membrane, the mechanical membrane generates a fluid enriched in the paramagnetic component. Alternately, the magnetic field may act to repel the paramagnetic component while diamagnetic components such as $N_2$ are generally unaffected and pass to the opposite side of the mechanical membrane.

Figure 1:
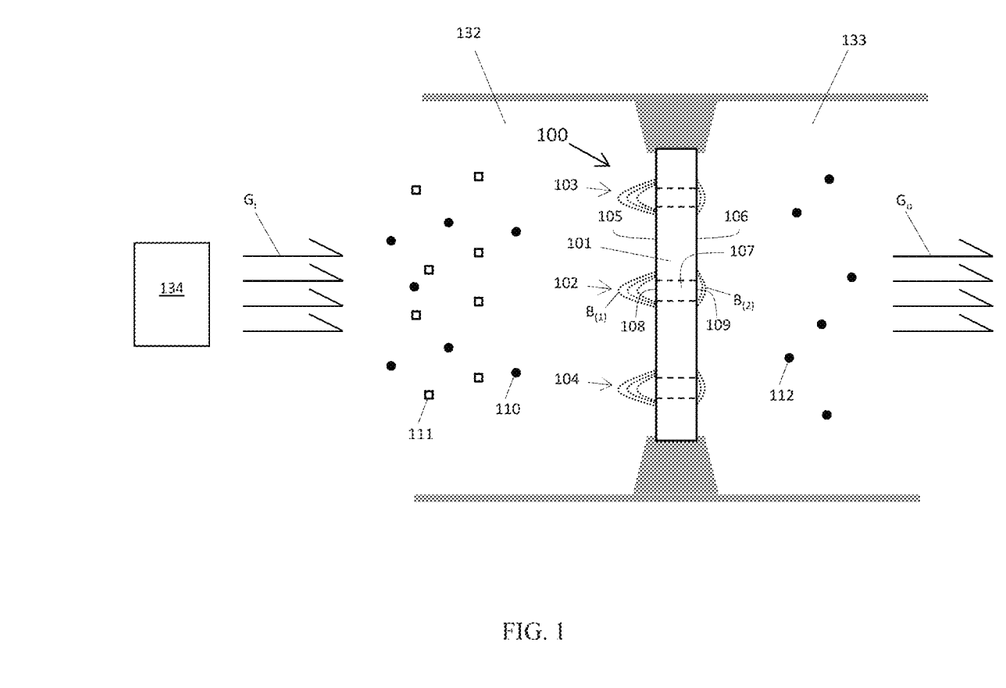
FIG. 1 illustrates a first embodiment of the mechanical membrane.

An embodiment of the apparatus and method is illustrated a FIG. 1. FIG. 1 depicts a mechanical membrane e generally at 100, where mechanical membrane 100 is comprised of supporting material 101 and a plurality of magnetic apertures, such as those represented generally at 102, 103, and 104. Supporting material has a first surface 105 and a second surface 106 opposite first surface 105, and each magnetic aperture comprises a pore, such as pore 107. Pore 107 extends through supporting material 101 and comprises a first pore opening 108 opening to the first surface 105 and a second pore opening 109 opening to the second surface 106. Additionally, at least first pore opening 108 is surrounded by a magnetic area generating a magnetic field. The magnetic field comprises a first magnetic field portion $B_{(1)}$ and a second magnetic field portion $B_{(2)}$, and the field strength of $B_{(1)}$ is greater than the field strength of $B_{(2)}$. Typically, the B1/B2 is tailored to optimize the separation rates specific to a given apparatus. In an embodiment, the field strength of $B_{(1)}$ is equal to at least 1.5 times the field strength of $B_{(2)}$ when the field strengths are determined through magnetometry above the first pore opening second pore opening respectively. In operation, a fluid flow $G_i$ is directed to first surface 105 of mechanical membrane 100, and first magnetic field portion $B_{(1)}$ tends to attract paramagnetic constituents within $G_i$ while tending to repel diamagnetic constituents. For example, when $G_i$ is air comprising $O_2$ such as $O_2$ molecule 110 and further comprising $N_2$ such as $N_2$ molecule 111, first magnetic field portion $B_{(1)}$ tends to attract $O_2$ molecule 110 and repel $N_2$ molecule 111. As a result, first magnetic field portion $B_{(1)}$ preferentially allowing $O_2$ constituents to pass through first pore opening 108, pore 107, and second pore opening 109, generating a resulting fluid flow $G_o$ enriched in the oxygen constituent, such as $O_2$ molecule 112. Alternatively, the magnetic area around the first pore opening may be established so that the first magnetic field portion $B_{(1)}$ tends to repel $O_2$ molecule 110 and allow $N_2$ molecule 111 to pass through first pore opening 108, pore 107, and second pore opening 109, generating the resulting fluid flow $G_o$ enriched in the diamagnetic constituent.

Figure 2:
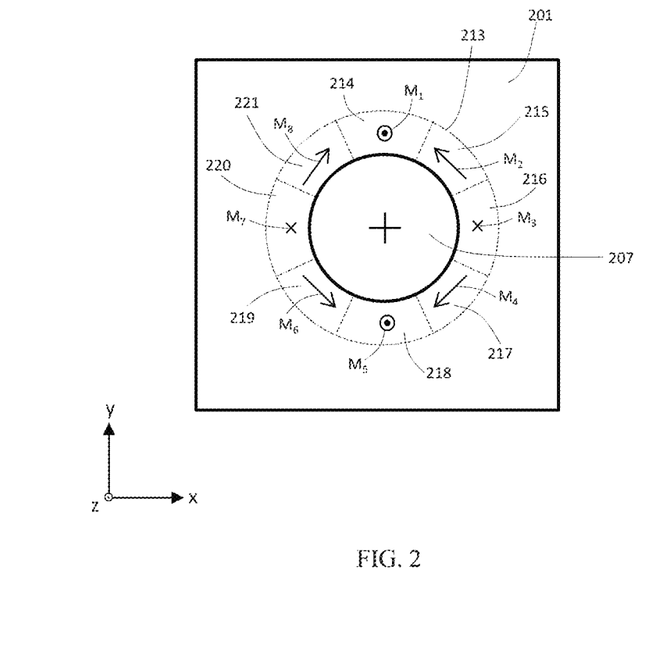
FIG. 2 illustrates a second embodiment of the mechanical membrane.

A specific illustration of a magnetic aperture comprising the mechanical membrane is illustrated at FIG. 2, with orientation in accordance with the x-y-z axis shown, where z extends out of the page. At FIG. 2, the magnetic aperture comprises a pore 207, where pore 207 is surrounded by magnetic area 213. A portion of the supporting material 201 which separates the plurality of magnetic apertures of the mechanical membrane is additionally illustrated. The magnetic area around pore 207 comprises a plurality of magnetic regions 214, 215, 216, 217, 218, 219, 220, and 221, and each magnetic region generates a magnetic field. The magnetic fields are represented as respective magnetic moments extending from the south pole of the magnetic field to the not h pole of the magnetic field, and are illustrated as $M_1$, $M_2$, $M_3$, $M_4$, $M_5$, $M_6$, $M_7$, and $M_8$ corresponding to magnetic regions 214, 215, 216, 217, 218, 219, 220, and 221 respectively. The magnetic moments have direction as indicated by the corresponding arrows, where a circled dot indicated a direction out of the page and an x indicates a direction into the page. As illustrated, the magnetic moments are spatially rotated with respect to neighboring magnetic moments to mimic configuration generally known as a Halbach array. Correspondingly, the plurality of magnetic regions interact to concentrate the magnetic field above pore 207. This is illustrated generally FIG. 3.

Figure 3:
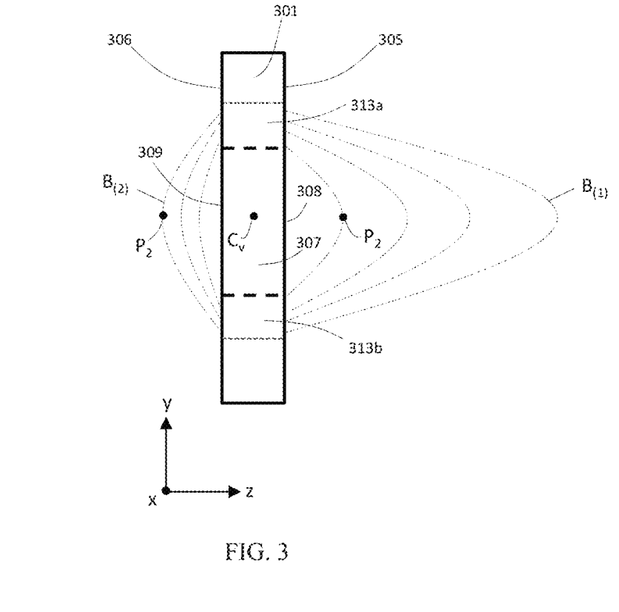
FIG. 3 illustrates an alternate view of the second embodiment.

FIG. 3 illustrates pore 207 as pore 307, magnetic area 213 as magnetic area 214, and supporting material 201 as supporting material 301, with orientation accordance with the x-y-z axis shown with x extending into the page. Additionally, FIG. 3 illustrates first surface 305 and second surface 306 of supporting material 301, as well as first pore opening 308 opening to first surface 305 and second pore opening 309 opening to second surface 306. Magnetic area 213 surrounds pore 307 and is represented at FIG. 3 as magnetic; area 313a and 313b. Additionally, at least first pore opening 308 is surrounded by a magnetic area generating a magnetic field. The arrangement of the magnetic regions comprising the magnetic area around pore 307 generates a magnetic field comprising first magnetic field portion $B_{(1)}$ generally neighboring first pore opening 308 on the first surface 305 of supporting material 301, and second magnetic field portion $B_{(2)}$ generally neighboring second pore opening 309 on the second surface 306 of supporting material 301, where the field strength of $B_{(1)}$ is greater than the field strength of $B_{(2)}$. As discussed, in one embodiment the magnetic regions Surrounding pore 307 are arranged such that when a fluid flow comprising a paramagnetic constituent and a diamagnetic constituent are directed toward first surface 305, the first magnetic field portion $B_{(1)}$ tends to attract the paramagnetic constituent and repel the diamagnetic constituent, such that an stream enriched in the paramagnetic constituent enters first pore opening 308, proceeds through pore 307, and issues from second pore opening 309. In an alternate embodiment, the magnetic regions are arranged such that the first magnetic field portion $B_{(1)}$ tends to repel the paramagnetic constituent and allow passage of the diamagnetic constituent through first pore opening 308, pore 307, and second pore opening 309, Typically, the magnetic regions are oriented with the easy axis of magnetization generally perpendicular to the first surface and/or first pore opening.

As discussed, the mechanical membrane comprises a plurality of magnetic apertures. In a particular embodiment, some portion of the magnetic apertures are separated from another portion of the magnetic apertures by some portion of the support material. In another embodiment, each magnetic aperture is separated from every other magnetic aperture in the plurality by at least some portion of the support material. Typically, the support material is selected to mitigate attraction/repulsion of the paramagnetic component to the support material relative to the magnetic apertures. In a particular embodiment, the support material comprises a particular material having a maximum energy product $BH_{SUP}$ and the magnetic regions comprise a magnetic material having a maximum energy product $BH_{MAG}$, and $BH_{SUP}$ is less than 25% of $BH_{MAG}$, such that $BH_{SUP} < 0.25\ BH_{MAG}$. In another embodiment, $BH_{sup} < 0.1\ BH_{MAG}$. In an embodiment, the particular material comprises at least 50 wt. % of the support material, and the magnetic material comprises at least at least 50 wt. % of the magnetic regions.

In the above descriptions and elsewhere, "support material" means a material having a first surface and a second surface opposite the first surface, so that some portion of the support material lies between the first surface and the second surface. The first surface and the second surface may be any shape planar or curved. In an embodiment, the first surface and/or second surface is generally planar, conical, cylindrical, or some combination.

Additionally, a "pore" as used in this disclosure means a volume which extends through the support material from the e first surface to the second surface. A "first pore opening" means an opening which places the volume and an environment contacting the first surface in fluid communication. In an embodiment, the first pore opening is bounded by a magnetic area of a magnetic aperture. A "second pore opening" means an opening which places the volume and an environment contacting the second surface in fluid communication, In an embodiment, the first pore opening has an average inner radius of less than 7 mm, preferably less than 5 mm, where the average inner radius is the average distance from the centroid of the first pore to the boundary of the first pore opening, In another embodiment, the first pore is circular and the average inner radius is the radius of the circle.

Additionally, a "magnetic area" means an area comprised of a plurality of magnetic regions. A "magnetic region" means a portion of the mechanical membrane that produces a magnetic field greater than that of the supporting material. Typically the magnetic region comprises magnetic materials exhibiting a $BH_{MAX}$ of at least 1 MGOe. In an embodiment, the magnetic materials comprise at least 50 wt. % of a magnetic region. In another embodiment, the magnetic materials comprise at least 50 wt. % of all magnetic regions around a given pore in the plurality of magnetic apertures.

In an embodiment, the magnetic area has an average outer radius and a ratio of the average outer radius to the average inner radius of the pore is equal to at least 2.5, where the average outer radius is the average distance from the centroid of the first pore to the outer boundary of the magnetic region, The "outer boundary" means a closed shape delineating a boundary between the plurality of magnetic areas surrounding a first pore opening and the support material. In an embodiment, the outer boundary is the closed shape having the smallest area which surrounds all the magnetic regions in a magnetic ea of a given magnetic aperture, in a particular embodiment where the magnetic regions comprise at least 50 wt. % of a magnetic material and the support material comprises at least 50 wt. % of the particular material, the outer boundary is a closed shape separating the magnetic regions and the support material, where the magnetic material and the particular material is as earlier defined.

Additionally, when a magnetic area is "around" a first pore opening, this means the plurality of magnetic regions is arranged such that magnetic moments of the magnetic regions generate a magnetic field comprising a first magnetic field portion above the first pore opening and a second magnetic field portion above the second pore opening, where the magnitude of the first magnetic field portion is greater than the magnitude of the second magnetic field portion. Here "above" with respect to a given pore opening for a specific pore means a point on a line extending through the first pore opening and the second pore opening, where the point is outside the volume of the specific pore, and where a displacement between the point and the givers pore is less than a displacement between the point and the other pore opening of the given pore. In an embodiment, the line extends through the centroid of the first pore opening and the centroid of the second pore opening. In another embodiment, a first point "above" a first pore opening and a second point "above" the second pore opening are equidistant from the centroid of the pore volume. In a particular embodiment, the first field strength B1 is determined at the first point and the second field strength B2 is determined at the second point, and the first field strength B1 is at least equal to 1.5 times the second field strength B2. For example, at FIG. 3, first point $P_1$ and second point $P_2$ are equidistant from the centroid $C_v$ of pore 307, and the magnitude of the first magnetic field portion $B_{(1)}$ at $P_1$ is greater than the magnitude of the second magnetic field portion $B_{(1)}$ at $P_2$, and in an embodiment, at least 1.5 times greater.

Additionally, "paramagnetic component" means an atom, molecule, or other material which may be attracted by the first magnetic field portion above the first pore opening of a magnetic aperture as disclosed herein. In an embodiment, the paramagnetic component is $O_2$ and the fluid, air, is comprised predominantly of a mixture of paramagnetic $O_2$ and diamagnetic $N_2$.

Figure 4:
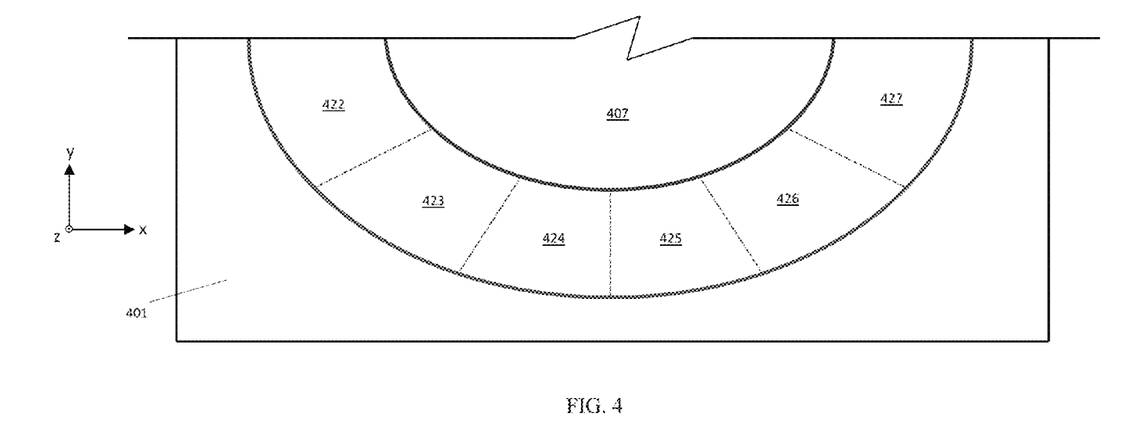
FIG. 4 illustrates a third embodiment of the mechanical membrane.
Figure 5:
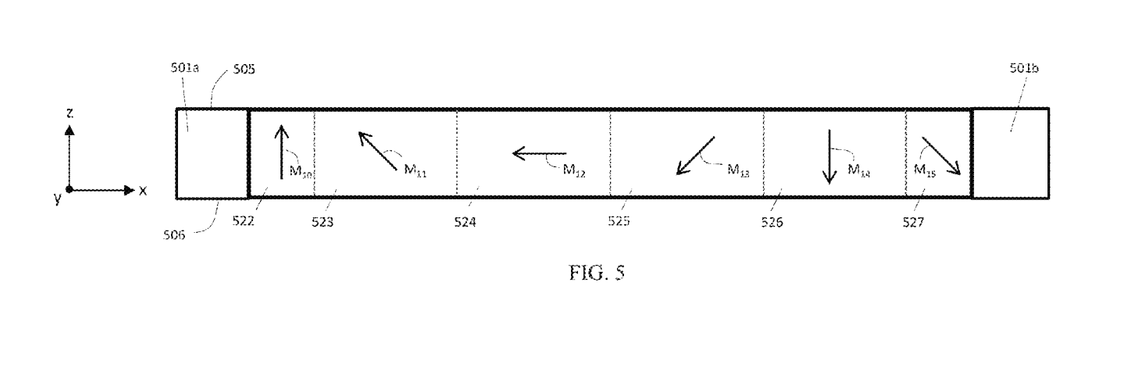
FIG. 5 illustrates an alternate view of the third embodiment.
Figure 6:
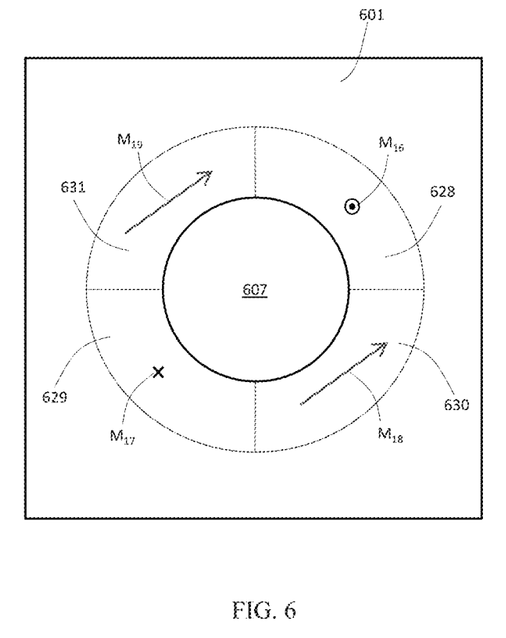
FIG. 6 illustrates a further embodiment of the mechanical membrane.

As discussed, the magnetic moment of a given magnetic region in a magnetic area around a pore is spatially rotated with respect to the neighboring magnetic moments of other magnetic regions adjacent to the given magnetic region. For example, FIG. 4 illustrates a section of a magnetic aperture comprising a section of support material 401 surrounding a section of pore 407 and magnetic regions 422, 423, 424, 425, 426, and 427, illustrated with respect to the x-y-z axes shown where z proceeds out of the page. FIG. 5 illustrates the same magnetic aperture with y proceeding into the page and illustrates magnetic regions 422, 423, 424, 425, 426, and 427 as 522, 523, 524, 525, 526, and 527 respectively, and illustrates support material 401 as 501a and 501b, along with first surface 505 and second surface 506. The magnetic moment and orientation is illustrated for each magnetic region at FIG. 5 as $M_{10}$, $M_{11}$, $M_{12}$, $M_{13}$, $M_{14}$, and $M_{15}$. In the example at FIG. 5, the magnetic moment of a given magnetic region is spatially rotated around the z-axis with respect to the magnetic moment of an adjacent magnetic region. Additionally, the spatial rotation is in a consistent rotational direction when, for each magnetic region, the adjacent magnetic region is displaced from the given magnetic region in a positive direction along the x axis. A similar relationship results when, for each magnetic region, the adjacent magnetic region is displaced in a negative direction along the x axis. In a particular embodiment, the plurality of magnetic regions comprising the magnetic area of a magnetic aperture comprises a first magnetic region such as 522 having a first magnetic moment such as $M_{10}$ in a first direction, where the first direction extends in a direction from the second surface such as 506 to the first surface such as 505 of a support material, and a second magnetic region such as 526 having a first magnetic moment such as $M_{14}$ in a second direction, where the second direction extends in a direction from the first surface 505 to the second surface 506 of the support material. This embodiment further comprises one or more intermediate regions between the first magnetic region and the second magnetic region, such as magnetic region 524 having magnetic moment $M_{12}$, where the magnetic moment of the intermediate magnetic region is spatially rotated in a specific direction of rotation with respect to the first magnetic moment, and where the second magnetic moment is spatially rotated in the specific direction of rotation with respect to the intermediate magnetic moment. For example, at FIG. 5, $M_{12}$ is rotated in a counter-clockwise direction with respect to $M_{10}$, and $M_{14}$ is rotated in a counter-clockwise direction with respect to $M_{12}$. Here the specific direction of rotation means a direction of rotation having the smallest angular displacement between two directions. A similar relationship exists when magnetic regions 523 and/or 525 are included in the one or more intermediate magnetic regions. In a further embodiment, a magnetic region comprises at least 4 magnetic regions including a first magnetic region with the magnetic moment in the first direction, a second magnetic region with the magnetic moment in the second direction, and at least two intermediate regions. For example, FIG. 6, with magnetic region 628 having magnetic moment $M_{16}$ in a first direction, magnetic region 629 having magnetic moment $M_{17}$ in a second direction, and intermediate magnetic regions 630 and 631 between magnetic regions 628 and 629, where magnetic moments $M_{18}$ and $M_{19}$ are spatially rotated as previously described.

The magnetic regions around a pore in a magnetic aperture may comprise a plurality of permanent magnets, or may comprise a Functionally Graded Material fabricated such that the regions around the plurality of poles exhibit magnetic moments corresponding to the orientations described herein. As is understood, in FGMs the composition and structure gradually change over volume, resulting in corresponding changes in the properties of the material, FGMs possess varying microstructural and mechanical properties and are typically multi-phase systems synthesized such that the composition of one or more constituents changes with respect to direction, generally yielding a predetermined composition profile. See e.g. Sobczak, J. & Drenchev, L., *Metal Based Functionally Graded Materials* (2009), among others. Functionally graded permanent magnets are known in the art. See e.g., U.S. Pat. No. 7,520,941 issued to Nakamura et al., issued Apr. 21, 2009.

The mechanical membrane may be utilized for the separation of a paramagnetic component from a fluid by using a forced circulation means such as forced circulation means 134 at FIG. 1 to generate a flow comprising a paramagnetic component, such as the fluid flow $G_i$. The fluid may be gaseous or liquid, and the forced circulation means may be any device which imparts momentum to a fluid using mechanical action. For example, the forced circulation means may be a mechanical fan comprising a rotating arrangement of vanes or blades acting on the fluid to generate the flow, or a positive displacement device such as a pump or compressor. The fluid flow may be ported into a fluid reservoir 132 in fluid communication with the first pore openings of the plurality of magnetic apertures 102, 103, and 104 and ported toward the toward the first surface 105 of supporting material 101. Some portion of the fluid flow $G_i$ contacts the plurality of magnetic apertures and interacts with the first magnetic field portions of the magnetic apertures. In an embodiment, paramagnetic constituents such as $O_2$ are attracted to the first magnetic field portions while diamagnetic components such as $N_2$ are repelled, and the paramagnetic components pass through the first pore openings to generate an enriched flow. In another embodiment, paramagnetic constituents are repelled by the first magnetic field portions while diamagnetic components are relatively unaffected or attracted, and the diamagnetic components pass through the first pore openings to generate the enriched flow. The enriched flow may issue through the second pore openings of the mechanical membrane and into separated component reservoir 133.

In another embodiment, the mechanical membrane comprises a system for the separation of a paramagnetic component. The system comprises the forced circulation means 134 generating a fluid flow $G_i$ containing the paramagnetic component, and fluid reservoir 132 in fluid communication with forced circulation means 134 and receiving the fluid flow $G_i$. The system further comprises the mechanical membrane 101 having characteristics as previously described, with the first magnetic field portions such as $B_{(1)}$ of the magnetic apertures extending into the fluid flow $G_i$. The system further comprises the first pore openings of the magnetic apertures receiving an enriched fluid, and the second pore openings of the magnetic apertures issuing the enriched fluid. The system may additionally comprise a separated component reservoir 133 in fluid communication with the second pore openings and receiving the enriched fluid.

Thus, disclosed here is an apparatus and method for the separation of a paramagnetic component from a mixture using a mechanical membrane apparatus. The mechanical membrane comprises a supporting material having pores extending through the supporting material, and a plurality of magnetic regions around each pore to augment a magnetic field on a first surface while mitigating the field to near zero on a second surface. In operation, a flow of fluid such as air comprising a paramagnetic component is directed toward the mechanical membrane, and the paramagnetic component is typically attracted toward a magnetic field surrounding a pore while diamagnetic components are generally repelled. The mechanical membrane acts to generate a fluid enriched in either the paramagnetic or diamagnetic components. The mechanical membrane is particularly useful for generating an enriched stream comprising oxygen from a mixture of oxygen and nitrogen, such as air.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A mechanical membrane for the separation of a paramagnetic component from a fluid comprising the paramagnetic component comprising:
    a supporting material having a first surface and a second surface;
    a plurality of magnetic apertures, where each magnetic aperture comprises
        a pore extending through the supporting material and comprising a first pore opening on the first surface of the supporting material and a second pore opening on the second surface of the supporting material, and,
        a magnetic area around the first pore opening, where the magnetic area comprises a plurality of magnetic regions, where each magnetic region in the plurality of magnetic regions has a magnetic field in a direction from a south pole to a north pole, and where the magnetic area generates a pore magnetic field comprising a first magnetic field portion above the first pore opening and a second magnetic field portion above the second pore opening, where a magnitude of the first magnetic field portion is greater than a magnitude of the second magnetic field portion.

2. The mechanical membrane of claim 1 where the plurality of magnetic regions comprises:
    a first magnetic region having a first magnetic field in a first direction, where the first direction extends from the second surface of the material to the first surface of the material;
    a second magnetic region having a second magnetic field in a second direction, where the second direction extends from the first surface of the material to the second surface of the material; and
    at least two intermediate regions, where each intermediate region is between the first magnetic region and the second magnetic region, and where the each intermediate region has an intermediate magnetic field, and where the intermediate magnetic field is spatially rotated in a specific direction of rotation with respect to the first magnetic field, and where the second magnetic field is spatially rotated in the specific direction of rotation with respect to the intermediate magnetic field.

3. The mechanical membrane of claim 2 where the first magnetic region, the second magnetic region, and the at least two intermediate regions are arranged such that the magnitude of the first magnetic field portion is equal to a first field strength B1 and the magnitude of the second magnetic field portion is equal to a second field strength B2, and the first field strength B1 is equal to at least 1.5 times the second field strength B2.

4. The mechanical membrane of claim 3 where the first pore opening has an average inner radius, where the average inner radius is less than 7 millimeters.

5. The mechanical membrane of claim 4 where the magnetic area has an average outer radius, where the average outer radius divided by the average inner radius is equal to at least 2.5.

6. The mechanical membrane of claim 5 where each magnetic area in the plurality of magnetic apertures is separated from every other magnetic area in the plurality of magnetic apertures by some portion of the supporting material.

7. An apparatus comprised of the mechanical membrane of claim 1 where the apparatus further comprises:
    a fluid reservoir in fluid communication with the first pore openings of the plurality of magnetic apertures; and
    a forced circulation means in fluid communication with the fluid reservoir.

8. A system for the separation of a paramagnetic component from a fluid comprising the paramagnetic component comprising:
    a forced circulation means generating a flow of the fluid comprising the paramagnetic component;
    a fluid reservoir in fluid communication with the forced circulation means and receiving the flow of the fluid; and
    a mechanical membrane in fluid communication with the fluid reservoir and comprising,
        a supporting material having a first surface and a second surface and,
        a plurality of magnetic apertures, where each magnetic aperture comprises
            a pore extending through the supporting material and comprising a first pore opening on the first surface of the supporting material and a second pore opening on the second surface of the supporting material and,
            a magnetic area around the first pore opening, and where the magnetic area comprises a plurality of magnetic regions, where each magnetic region in the plurality of magnetic regions has a magnetic field in a direction from a south pole to a north pole, and where the magnetic area generates magnetic field comprising a first magnetic field portion above the first pore opening and a second magnetic field portion above the second pore opening, where a magnitude of the first magnetic field portion is greater than a magnitude of the second magnetic field portion, and some part of the first magnetic field portion extending into some portion of the flow of the fluid and the first pore opening receiving an enriched fluid, where the enriched fluid comprises a quantity of the some portion of the flow of fluid, and the second pore opening issuing the enriched fluid.

9. The system of claim 8 where the plurality of magnetic regions comprises:
    a first magnetic region having a first magnetic field in a first direction, where the first direction extends from the second surface of the material to the first surface of the material;
    a second magnetic region having a second magnetic field in a second direction, where the second direction extends from the first surface of the material to the second surface of the material; and
    at least two intermediate regions, where each intermediate region is between the first magnetic region and the second magnetic region, and where the each intermediate region has an intermediate magnetic field, and where the intermediate magnetic field is spatially rotated in a specific direction of rotation with respect to the first magnetic field, and where the second magnetic field is spatially rotated in the specific direction of rotation with respect to the intermediate magnetic field.

10. The system of claim 9 where the first magnetic region, the second magnetic region, and the at least two intermediate regions are arranged such that the magnitude of the first magnetic field portion is equal to a first field strength $B1$ and the magnitude of the second magnetic field portion is equal to a second field strength $B2$, and the first field strength $B1$ is equal to at least 1.5 times the second field strength $B2$.

11. The system of claim 10 where the first pore opening has an average inner radius, where the average inner radius is less than 7 millimeters.

12. The system of claim 11 where the magnetic area has an average outer radius, where the average outer radius divided by the average inner radius is equal to at least 2.5.

13. The system of claim 12 where each magnetic area in the plurality of magnetic apertures is separated from every other magnetic area in the plurality of magnetic apertures by some portion of the supporting material.

* * * * *